US008437923B2

(12) United States Patent
Sano et al.

(10) Patent No.: US 8,437,923 B2
(45) Date of Patent: May 7, 2013

(54) ROTATION DRIVE CONTROL UNIT AND CONSTRUCTION MACHINE INCLUDING SAME

(75) Inventors: Kiminori Sano, Chiba (JP); Hiroso Shono, Kanagawa (JP)

(73) Assignees: Sumitomo(S.H.I) Construction Machinery Co., Ltd., Tokyo (JP); Sumitomo Heavy Industries, Ltd., Tokyo (JP)

( * ) Notice: Subject to any disclaimer, the term of this patent is extended or adjusted under 35 U.S.C. 154(b) by 241 days.

(21) Appl. No.: 12/994,209

(22) PCT Filed: May 29, 2008

(86) PCT No.: PCT/JP2008/059938
§ 371 (c)(1),
(2), (4) Date: Nov. 23, 2010

(87) PCT Pub. No.: WO2009/144803
PCT Pub. Date: Dec. 3, 2009

(65) Prior Publication Data
US 2011/0071739 A1 Mar. 24, 2011

(51) Int. Cl.
*G06G 7/00* (2006.01)
(52) U.S. Cl.
USPC .................................. 701/50; 37/348; 37/347
(58) Field of Classification Search ............... 701/50
See application file for complete search history.

(56) References Cited

U.S. PATENT DOCUMENTS

| | | | | |
|---|---|---|---|---|
| 6,851,207 B2 * | 2/2005 | Yoshimatsu | ...................... | 37/348 |
| 7,067,999 B2 * | 6/2006 | Sugano et al. | ................. | 318/372 |
| 7,615,960 B2 * | 11/2009 | Morinaga et al. | .............. | 318/609 |
| 7,659,677 B2 * | 2/2010 | Yoshimatsu et al. | ........... | 318/371 |
| 7,869,923 B2 * | 1/2011 | Kawaguchi | ...................... | 701/50 |
| 8,190,334 B2 * | 5/2012 | Kagoshima et al. | ............. | 701/50 |
| 2005/0253542 A1 | 11/2005 | Sugano et al. | | |

FOREIGN PATENT DOCUMENTS

| | | |
|---|---|---|
| JP | 08-302750 | 11/1996 |
| JP | 2001-011897 | 1/2001 |
| JP | 2004-036303 | 2/2004 |
| JP | 2007-1130327 | 4/2007 |
| WO | WO 96-34155 | 10/1996 |

* cited by examiner

*Primary Examiner* — Thomas Tarcza
*Assistant Examiner* — Tyler J Lee
(74) *Attorney, Agent, or Firm* — IPUSA, PLLC

(57) ABSTRACT

A rotation drive control unit configured to control the driving of the rotation mechanism of a construction machine driven to rotate by an electric motor includes a speed command output part configured to output a speed command controlling the rotation speed of the electric motor based on the amount of operation input via the operation part of the construction machine; a torque direction detection part configured to detect the direction of torque applied on the rotation shaft of the rotation mechanism; and a drive control part configured to generate a drive command driving the electric motor based on the speed command output from the speed command output part and to control the driving of the electric motor, wherein in starting rotation of the rotation mechanism, the drive control part starts driving the electric motor using the drive command if the direction of the rotation represented by the speed command output from the speed command output part and the direction of the torque detected by the torque direction detection part are opposite directions.

9 Claims, 9 Drawing Sheets

FIG.6
(a)
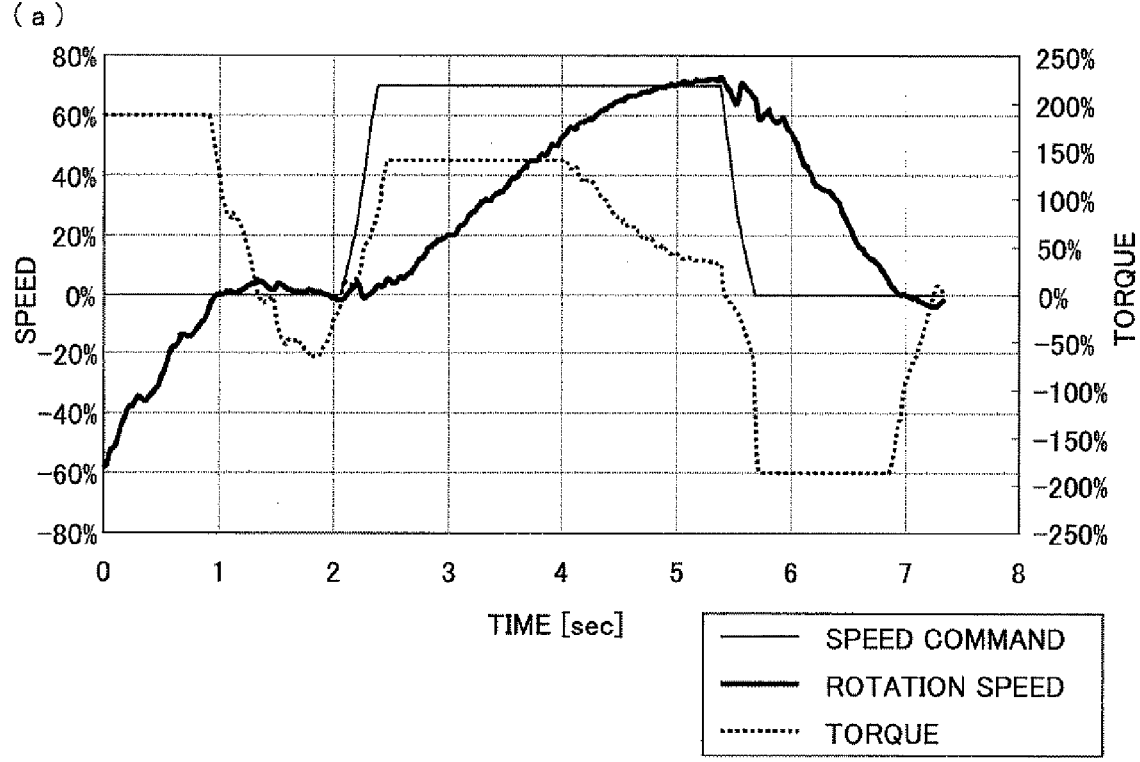
(b)
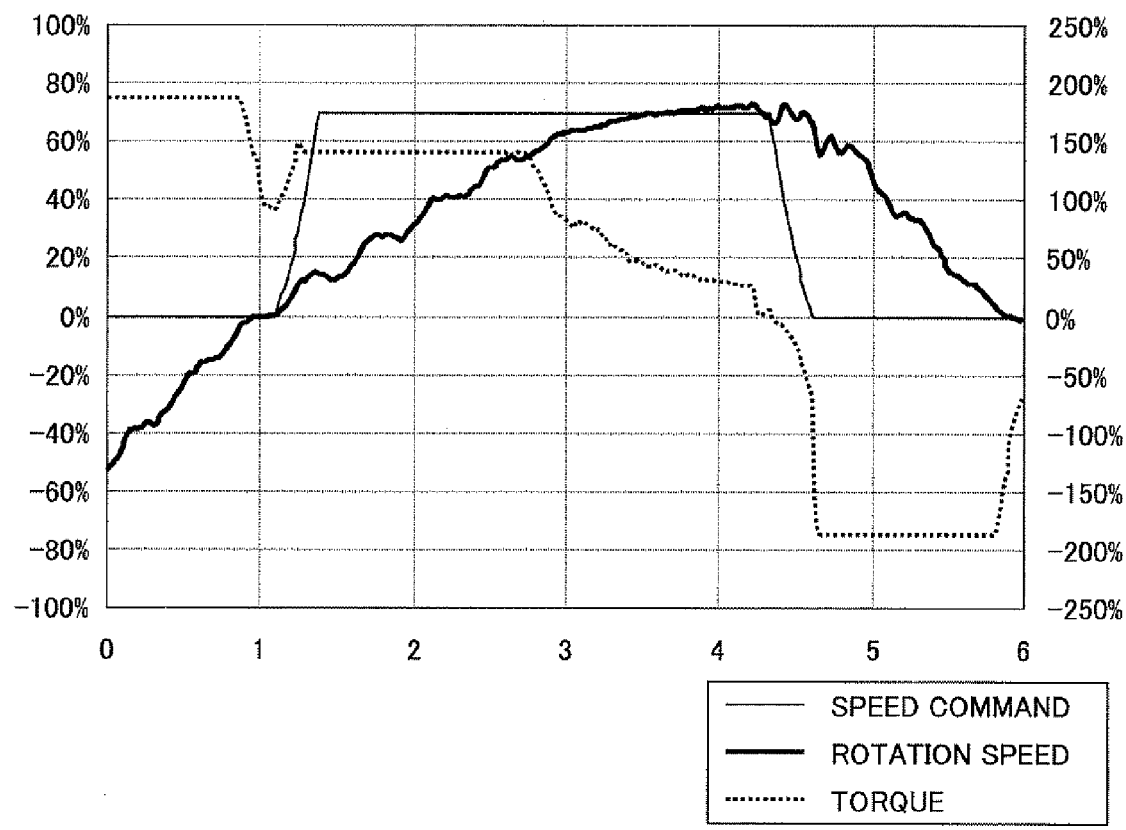

ROTATION DRIVE CONTROL UNIT AND CONSTRUCTION MACHINE INCLUDING SAME

TECHNICAL FIELD

The present invention relates to a rotation drive control unit configured to control the driving of the rotation mechanism of a construction machine and to a construction machine including the same.

BACKGROUND ART

Conventionally, a construction machine has been proposed that has an electric motor as a power source for a rotation mechanism for rotating an upper-part rotating body. In such a construction machine, the rotation mechanism is accelerated (driven) by the power running operation of the electric motor, while a regenerative operation is performed at the time of decelerating (braking) the rotation mechanism to charge a battery with generated electric power (for example, Patent Document 1). Further, the construction machine described in Patent Document 1 has a hydraulic pump in order to hydraulically drive other drive mechanisms than the rotation mechanism, and has a generator connected via a speed-increasing machine to an engine for driving this hydraulic pump, so as to use the electric power produced by power generation to charge the battery and to drive the electric motor of the rotation mechanism.

[Patent Document 1] Japanese Laid-Open Patent Application No. 2004-036303

DISCLOSURE OF THE INVENTION

Problems to be Solved by the Invention

Elongated working elements such as a boom and an arm are mounted on the upper-part rotating body. Further, a bucket is connected to the end of the arm. The boom and the arm are elongated, and the bucket connected to its end is very heavy. Therefore, oscillations are generated in the rotating direction in the boom, the arm, and the bucket immediately after the upper-part rotating body stops rotating.

In the case of re-performing rotation in such a state where oscillations are generated, if rotation is started with the oscillating direction and the rotating direction being the same, the boom, the arm, and the bucket are swung back in a direction to delay with respect to the rotating direction, thereby amplifying the oscillations (or generating new oscillations). This causes a problem in that a smooth start of rotation may be prevented to degrade ride quality.

Further, such amplification of oscillations may become more conspicuous if the bucket is loaded with dirt or a lifting magnet heavier than the bucket is attached.

Further, if a smooth start of rotation is thus prevented, impact due to the backlash of gears of the rotation mechanism may be caused.

The occurrence of teeth hitting due to such backlash causes a large impact to be transmitted to the upper-part rotating body, thus causing a problem in that the driving of rotation is not started smoothly to degrade ride quality. Further, there is a problem in that the continuation of teeth hitting due to backlash damages gears of the rotation mechanism.

The present invention has an object of providing a rotation drive control unit that makes ride quality good at a start of rotation and enables a construction machine to have a longer useful service life, and a construction machine including the same.

Means for Solving the Problems

A rotation drive control unit according to one aspect of the present invention, which is configured to control driving of a rotation mechanism of a construction machine driven to rotate by an electric motor, includes a speed command output part configured to output a speed command controlling a rotation speed of the electric motor based on an amount of operation input via an operation part of the construction machine; a torque direction detection part configured to detect a direction of a torque applied on a rotation shaft of the rotation mechanism; and a drive control part configured to generate a drive command driving the electric motor based on the speed command output from the speed command output part and to control driving of the electric motor, wherein in starting a rotation of the rotation mechanism, the drive control part starts driving the electric motor using the drive command if a direction of the rotation represented by the speed command output from the speed command output part and the direction of the torque detected by the torque direction detection part are opposite directions.

Further, if the direction of the rotation represented by the speed command output from the speed command output part and the direction of the torque detected by the torque direction detection part are a same direction when the operation part is operated, the drive control part may start driving the electric motor after the direction of the torque detected by the torque direction detection part becomes opposite to the direction of the rotation.

Further, if the direction of the rotation represented by the speed command output from the speed command output part and the direction of the torque detected by the torque direction detection part are the same direction, the drive control part may cause an absolute value of a value of the drive command to be less than or equal to a predetermined value until the direction of the torque detected by the torque direction detection part becomes opposite to the direction of the rotation.

Further, in this case, the drive control part may include a limiting part configured to limit the absolute value of the value of the drive command so that a drive torque generated in the electric motor by the drive command is less than or equal to an allowable value, and cause the absolute value of the value of the drive command to be less than or equal to the predetermined value by causing an absolute value of the allowable value to be less than a normal value.

Further, the torque direction detection part may be configured to calculate a temporal change in the rotation speed of the electric motor and to detect, as the direction of the torque, a direction of an acceleration represented by the temporal change in the rotation speed.

In addition, alternatively, the torque direction detection part may be configured to detect, as the direction of the torque, a torque direction represented by the drive command generated by the drive control part.

In addition, alternatively, the rotation drive control unit may further include an accelerometer configured to detect an acceleration generated by the rotation of the rotation mechanism, and the torque direction detection part may be configured to detect the direction of the torque based on a direction of the acceleration detected by the accelerometer.

A construction machine according to one aspect of the present invention includes the rotation drive control unit as described in one of the above.

Effects of the Invention

According to the present invention, the effect is produced that it is possible to provide a rotation drive control unit that makes ride quality good at a start of rotation and enables a construction machine to have a longer useful service life, and a construction machine including the same.

BRIEF DESCRIPTION OF THE DRAWINGS

FIG. 6 shows graphs illustrating characteristics of a speed command, a rotation speed, and a drive torque at a time when the rotation of the rotation electric motor 21 is started by the rotation drive control unit 40 of the first embodiment, where (a) indicates characteristics in the case of starting rotation when the phases are opposite, and (b) indicates characteristics in the case of starting rotation when the phases are the same for the purpose of comparison.

Figure 1:
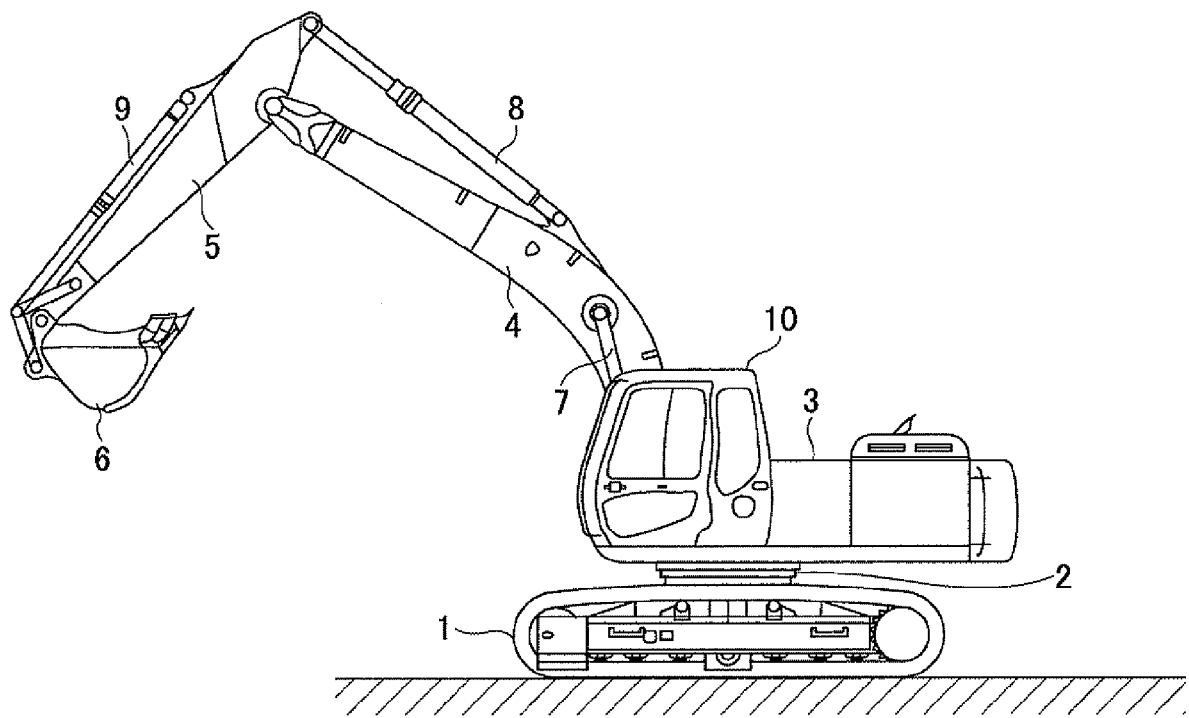
FIG. 1 is a side view illustrating a construction machine including a rotation drive control unit of a first embodiment.

DESCRIPTION OF THE REFERENCE NUMERALS 1 lower-part running body
1A, 1B hydraulic motor
2 rotation mechanism
3 upper-part rotating body
4 boom
5 arm
6 bucket
7 boom cylinder
8 arm cylinder
9 bucket cylinder
10 cabin
11 engine
12 motor generator
13 reduction machine
14 main pump
15 pilot pump
16 high-pressure hydraulic line
17 control valve
18 inverter
19 battery
20 inverter
21 rotation electric motor
21A rotation shaft
22 resolver
23 mechanical brake
24 rotation reduction machine
25 pilot line
26 operation apparatus
26A, 26B lever
26C pedal
27 hydraulic line
28 hydraulic line
29 pressure sensor
30 controller
31 speed command conversion part
32 drive control unit
40 rotation drive control unit
50 drive command generation part
51 subtractor
52 PI control part
53 torque limiting part
54 torque limiting part
55 subtractor
56 PI control part
57 current conversion part
58 rotating motion detection part
60 main control part
70 accelerometer

BEST MODE FOR CARRYING OUT THE INVENTION

A description is given below of embodiments to which a rotation drive control unit according to the present invention and a construction machine including the same are applied.

First Embodiment

FIG. 1 is a side view illustrating a construction machine including a rotation drive control unit of a first embodiment.

An upper-part rotating body 3 is mounted through a rotation mechanism 2 on a lower-part traveling body 1 of this hybrid construction machine. Further, in addition to a boom 4, an arm 5, a bucket 6, and a boom cylinder 7, an aim cylinder 8, and a bucket cylinder 9 for hydraulically driving them, a cabin 10 and power sources are mounted on the upper-part rotating body 3.

[Overall Configuration]

Figure 2:
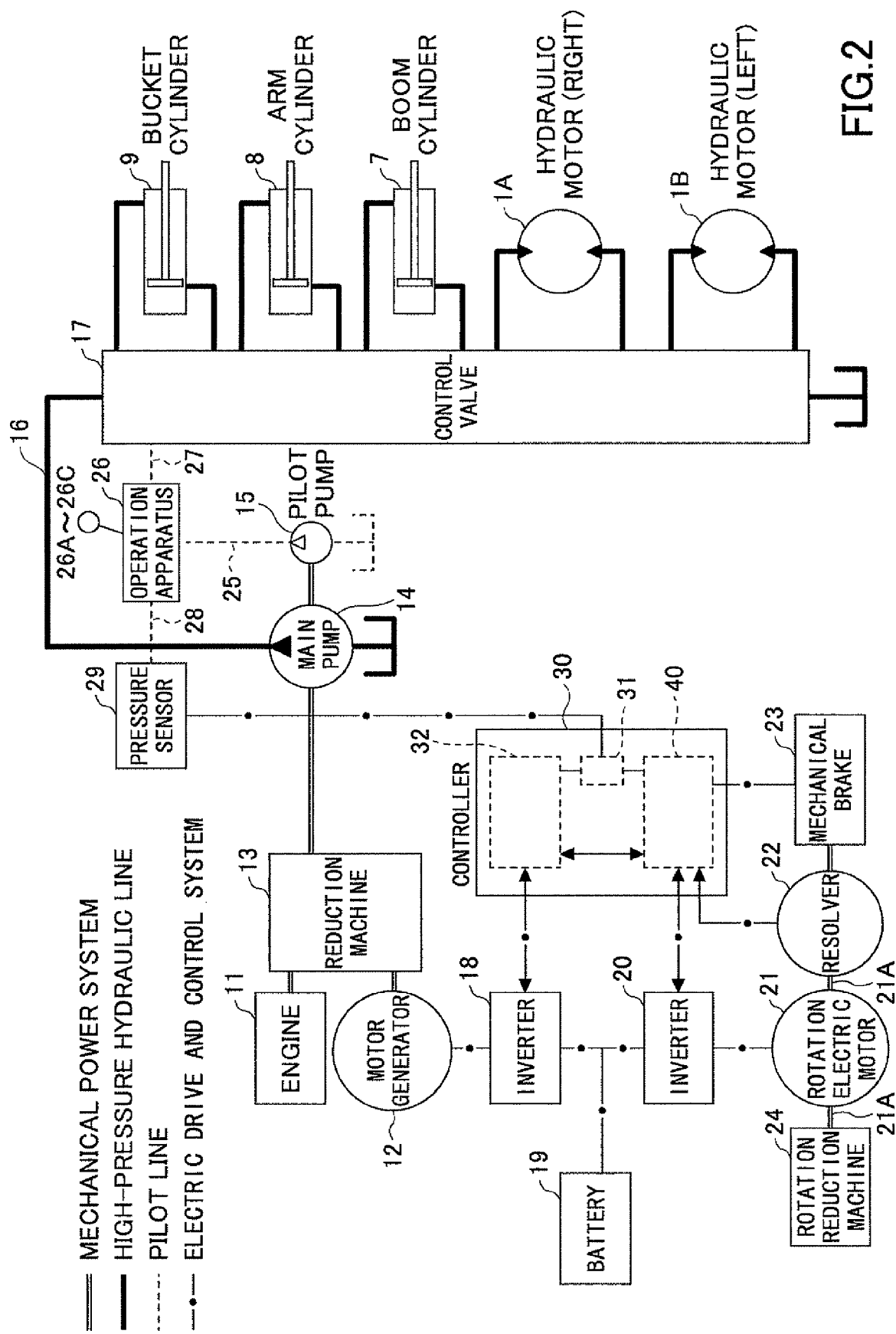
FIG. 2 is a block diagram illustrating a configuration of the construction machine including the rotation drive control unit of the first embodiment.

FIG. 2 is a block diagram illustrating a configuration of the construction machine including the rotation drive control unit of the first embodiment. In FIG. 2, a double line, a solid line, a broken line, and a one-dot-chain line indicate a mechanical power system, a high-pressure hydraulic line, a pilot line, and an electric drive and control system, respectively.

An engine 11 as a mechanical drive part and a motor generator 12 as an assist drive part are both connected to the input shafts of a reduction machine 13 as a power-up machine. Further, a main pump 14 and a pilot pump 15 are connected to the output shaft of this reduction machine 13. A control valve 17 is connected to the main pump 14 via a high-pressure hydraulic line 16.

The control valve 17 is a control unit that controls a hydraulic system in the construction machine of the first embodiment. Hydraulic motors 1A (for the right) and 1B (for the left) for the lower-part traveling body 1, the boom cylinder 7, the arm cylinder 8, and the bucket cylinder 9 are connected to this control valve 17 via high-pressure hydraulic lines.

Further, a battery 19 is connected to the motor generator 12 via an inverter 18. Further, a rotation electric motor 21 is connected to the battery 19 via an inverter 20.

A resolver 22, a mechanical brake 23, and a rotation reduction machine 24 are connected to a rotation shaft 21A of the rotation electric motor 21. Further, an operation apparatus 26 is connected to the pilot pump 15 via a pilot line 25.

The control valve 17 and a pressure sensor 29 are connected to the operation apparatus 26 via hydraulic lines 27 and 28, respectively. A controller 30 that controls the driving of the electric system of the construction machine of the first embodiment is connected to this pressure sensor 29.

This construction machine of the first embodiment is a hybrid construction machine that uses the engine 11, the motor generator 12, and the rotation electric motor 21 as power sources. These power sources are mounted on the upper-part rotating body 3 illustrated in FIG. 1. A description is given below of each part.

[Configuration of Each Part]

The engine 11, which is, for example, an internal combustion engine constituted of a diesel engine, has its output shaft connected to one of the input shafts of the reduction machine 13. The engine 11 is operated constantly during the operation of the construction machine.

The motor generator 12 may be an electric motor capable of performing both a power running operation and a regenerative operation. Here, a motor generator AC-driven by the inverter 18 is illustrated as the motor generator 12. This motor generator 12 may be constituted of, for example, an IPM (Interior Permanent Magnetic) motor having magnets embedded in a rotor. The rotation shaft of the motor generator 12 is connected to the other one of the input shafts of the reduction machine 13.

The reduction machine 13 has two input shafts and one output shaft. The two input shafts are connected to the drive shaft of the engine 11 and the drive shaft of the motor generator 12, respectively. Further, the output shaft is connected to the drive shaft of the main pump 14. In the case of a heavy load on the engine 11, the motor generator 12 performs a power running operation, so that the driving force of the motor generator 12 is transmitted to the main pump 14 via the output shaft of the reduction machine 13. This assists the driving of the engine 11. On the other hand, in the case of a light load on the engine 11, the driving force of the engine 11 is transmitted to the motor generator 12 via the reduction machine 13, so that the motor generator 12 performs a regenerative operation to generate electric power. The power running operation and the regenerative operation of the motor generator 12 are switched by the controller 30 in accordance with a load on the engine 11.

The main pump 14 is a pump that generates a hydraulic pressure to be supplied to the control valve 17. This hydraulic pressure is supplied via the control valve 17 to drive each of the hydraulic motors 1A and 1B, the boom cylinder 7, the arm cylinder 8, and the bucket cylinder 9.

The pilot pump 15 is a pump that generates a pilot pressure necessary for a hydraulic operation system. A description is given below of a configuration of this hydraulic operation system.

The control valve 17 is a hydraulic pressure control unit that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling hydraulic pressure to be supplied to each of them in accordance with an input of an operation by an operator.

The inverter 18 is an inverter provided between the motor generator 12 and the battery 19 in order to supply electric power necessary for the power running operation of the motor generator 12 from the battery 19 to the motor generator 12 and to charge the battery 19 with the electric power generated by the regenerative operation of the motor generator 12.

The battery 19 is provided between the inverter 18 and the inverter 20. Thereby, the battery 19 serves as a power supply for supplying necessary electric power for a power running operation when at least one of the motor generator 12 and the rotation electric motor 21 is performing the power running operation and for storing the electric power regenerated by a regenerative operation as electric energy when at least one of the motor generator 12 and the rotation electric motor 21 is performing the regenerative operation.

The inverter 20, which is provided between the rotation electric motor 21 and the battery 19 as described above, controls the operation of the rotation electric motor 21 based on instructions from the controller 30. As a result, when controlling the power running operation of the rotation electric motor 21, the inverter 20 supplies necessary electric power from the battery 19 to the rotation electric motor 21. Further, during the regenerative operation of the rotation electric motor 21, the inverter charges the battery 19 with the electric power generated by the rotation electric motor 21.

The rotation electric motor 21, which may be an electric motor capable of both a power running operation and a regenerative operation, is provided in order to drive the rotation mechanism 2 of the upper-part rotating body 3. The rotation electric motor 21 is subjected to drive control so as to accelerate the upper-part rotating body 3 by a power running operation and to perform a regenerative operation at the time of decelerating the upper-part rotating body 3. Here, a motor generator AC-driven by the inverter 20 is illustrated as the rotation electric motor 21. This rotation electric motor 21 may be constituted of an IPM motor of a magnet embedded type.

The charge and discharge of the battery 19 is controlled by the controller 30 based on the charge state of the battery 19, the operating state (power running operation or regenerative operation) of the motor generator 12, and the operating state (power running operation or regenerative operation) of the rotation electric motor 21.

The resolver 22 is a sensor that detects the rotation position and the rotation angle of the rotation shaft 21A of the rotation electric motor 21. The resolver 22 is mechanically joined to the rotation electric motor 21 to detect a difference between the rotation position before rotation and the rotation position after a counterclockwise rotation or a clockwise rotation of the rotation shaft 21A of the rotation electric motor 21, thereby detecting the rotation angle and the rotation direction of the rotation shaft 21A. By detecting the rotation angle of the rotation shaft 21A of the rotation electric motor 21, the rotation angle and the rotation direction of the rotation mechanism 2 are derived.

The mechanical brake 23, which is a braking device that generates a mechanical braking force, mechanically stops the rotation shaft 21A of the rotation electric motor 21. This mechanical brake 23 is switched between braking (ON) and release (OFF) by an electromagnetic switch.

The rotation reduction machine 24 is a reduction machine that reduces the rotation speed of the rotation shaft 21A of the rotation electric motor 21 and mechanically transmits it to the rotation mechanism 2.

The rotation mechanism 2 is rotatable with the mechanical brake 23 of the rotation electric motor 21 being released, and the upper-part rotating body 3 is rotated counterclockwise or clockwise in this state.

The operation apparatus 26, which is an operation apparatus for operating the rotation electric motor 21, the lower-part traveling body 1, the boom 4, the arm 5, and the bucket 6, includes levers 26A and 26B and pedals 26C. The lever 26A, which is a lever for operating the rotation electric motor 21 and the arm 5, is provided near the driver's seat of the upper-part rotating body 3. The lever 26B, which is a lever for operating the boom 4 and the bucket 6, is provided near the driver's seat of the upper-part rotating body 3. The pedals 26C, which are a pair of pedals for operating the lower-part traveling body 1, are provided at the foot of the driver's seat.

This operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the levers 26A and 26B and the pedal 26C are operated respectively, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thereby, the lower-part traveling body 1, the boom 4, the arm 5, and the bucket 6 are driven.

Further, the mechanical brake 23 is configured to be released by the controller 30 when one of the levers 26A and 26B and the pedal 260 is operated.

The hydraulic line 27 supplies hydraulic pressures necessary for driving the hydraulic motors 1A and 1B, the boom cylinder 7, the arm cylinder 8, and the bucket cylinder 9 to the control valve 17.

In the pressure sensor 29, a change in the hydraulic pressure inside the hydraulic line 28 due to the operation of the lever 26A is detected. The pressure sensor 29 outputs an electrical signal representing the hydraulic pressure inside the hydraulic line 28. This electrical signal is input to the controller 30.

[Controller 30]

The controller 30, which is a control unit that controls the driving of the construction machine of the first embodiment, includes a speed command conversion part 31, a drive control unit 32, and a rotation drive control unit 40. The controller 30 is constituted of a processor including a CPU (Central Processing Unit) and an internal memory, and the speed command conversion part 31, the drive control unit 32, and the rotation drive control unit 40 are devices implemented by the CPU of the controller 30 executing a program for drive control contained in the internal memory.

The speed command conversion part 31 is a processing part configured to convert a signal input from the pressure sensor 29 into a speed command. Thereby, the amount of operation of the lever 26A is converted into a speed command (rad/s) for causing the rotation electric motor 21 to be rotationally driven. This speed command is input to the drive control unit 32 and the rotation drive control unit 40.

The drive control unit 32 is a control unit for controlling the operation of the motor generator 12 (switching between a power running operation and a regenerative operation) and controlling the charge and discharge of the battery 19. This drive control unit 32 switches the power running operation and the regenerative operation of the motor generator 12 in accordance with the load state of the engine 11 and the charge state of the battery 19. The drive control unit 32 controls the charge and discharge of the battery 19 via the inverter 18 by switching the power running operation and the regenerative operation of the motor generator 12.

[Conversion Characteristic of Operation Amount/Speed Command]

Figure 3:
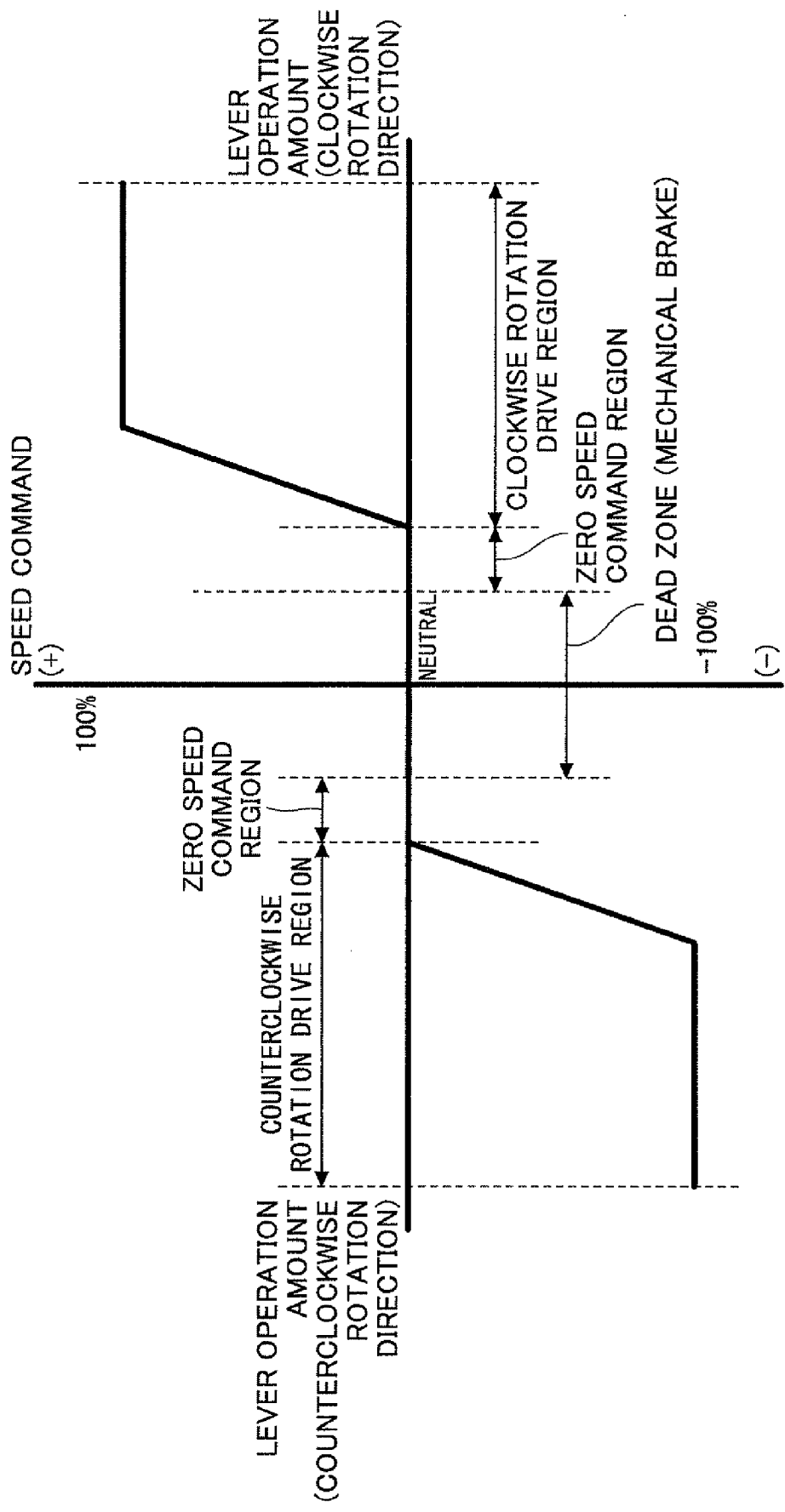
FIG. 3 is a diagram illustrating a conversion characteristic of converting the amount of operation of an operation lever 26A into a speed command (a speed command for causing a rotation electric motor 21 to rotate to cause an upper-part rotating body 3 to rotate) in a speed command conversion part 31 of the construction machine of the first embodiment.

FIG. 3 is a diagram illustrating a conversion characteristic of converting the amount of operation of the operation lever 26A into a speed command (a speed command for causing the rotation electric motor 21 to rotate to cause the upper-part rotating body 3 to rotate) in the speed command conversion part 31 of the construction machine of the present embodiment.

Here, the conversion characteristic illustrated in FIG. 3 is a characteristic in the case of starting rotation at a state where the rotation electric motor 21 is stopped (in the case of starting rotation at a state where the upper-part rotating body 3 is stopped), and is divided into five regions, which are a dead zone region, zero speed command regions (for a counterclockwise rotation and for a clockwise rotation), a counterclockwise rotation drive region, and a clockwise rotation drive region, in accordance with the amount of operation of the operation lever 26A.

Here, in the control system of the construction machine of the first embodiment, the rotation direction in which the rotation shaft 21A of the rotation electric motor 21 rotates counterclockwise is referred to as "forward rotation," and a positive sign is attached to the amount of control representing driving in the forward rotation direction. On the other hand, the rotation direction in which the rotation shaft 21A of the rotation electric motor 21 rotates clockwise is referred to as "reverse rotation," and a negative sign is attached to the amount of control representing driving in the reverse rotation direction. The forward rotation corresponds to the clockwise rotation of the upper-part rotating body 3, and the reverse rotation corresponds to the counterclockwise rotation of the upper-part rotating body 3.

[Dead Zone Region]

As illustrated in this conversion characteristic, the dead zone region is provided in the vicinity of the neutral point (within the range of ±10%) of the lever 26A. In this dead zone region, no speed command is output from the speed command conversion part 31, and no drive control of the rotation electric motor 21 is performed by the rotation drive control unit 40. Further, in the dead zone region, the mechanical brake 23 puts the rotation electric motor 21 in a mechanically stopped state.

Accordingly, while the amount of operation of the lever 26A is in the dead zone region, the rotation electric motor 21 is mechanically stopped by the mechanical brake 23, so that the upper-part rotating body 3 is mechanically stopped.

[Zero Speed Command Regions]

The zero speed command regions are provided outside the dead zone region in both operating directions of the lever 26A (within the +10% to 20% and −20% to −10% range of the amount of operation). These zero speed command regions are buffer regions provided for better operability in the case of switching between the stopped state in the dead zone region and the rotated state in the clockwise and counterclockwise rotation drive regions of the upper-part rotating body 3.

When the amount of operation of the operation lever 26A is within the range of these zero speed command regions, a zero speed command is output from the speed command conversion part 31, so that the mechanical brake 23 is released.

Here, the zero speed command is a speed command for causing the rotation speed of the rotation shaft 21A of the rotation electric motor 21 to be zero in order to cause the rotation speed of the upper-part rotating body 3 to be zero, and is used as a target value for causing the rotation speed of the rotation shaft 21A to be closer to zero in PI (Proportional Integral) control to be described below.

The switching of braking (ON) and release (OFF) of the mechanical brake 23 is performed at the boundaries between the dead zone region and the zero speed command regions by the rotation drive control unit 40 in the controller 30.

Accordingly, while the amount of operation of the lever 26A is within the zero speed command regions, the mechanical brake 23 is released, and the rotation shaft 21A of the rotation electric motor 21 is kept in the stopped state by the zero speed command. Thereby, the upper-part rotating body 3 is kept in the stopped state without being driven to rotate.

[Counterclockwise Rotation Drive Region]

The counterclockwise rotation drive region is a region where a speed command for causing the upper-part rotating body 3 to rotate counterclockwise is output from the speed command conversion part 31.

In this region, the absolute value of a speed command is determined to increase in accordance with the amount of operation of the lever 26A. A drive command is calculated based on this speed command in the rotation drive control unit 40, and the rotation electric motor 21 is driven based on this drive command. As a result, the upper-part rotating body 3 is driven to rotate counterclockwise.

The absolute value of the speed command value in the counterclockwise rotation drive region is limited by a predetermined value in order to limit the rotation speed of the upper-part rotating body 3 to a certain value or less.

[Clockwise Rotation Drive Region]

The clockwise rotation drive region is a region where a speed command for causing the upper-part rotating body 3 to rotate clockwise is output from the speed command conversion part 31.

In this region, the absolute value of a speed command is determined to increase in accordance with the amount of operation of the lever 26A. A drive command is calculated based on this speed command in the rotation drive control unit 40, and the rotation electric motor 21 is driven based on this drive command. As a result, the upper-part rotating body 3 is driven to rotate clockwise.

Like in the counterclockwise rotation drive region, the absolute value of the speed command value in the clockwise rotation drive region is limited by a predetermined value.

The characteristic illustrated in FIG. 3 shows a characteristic at the time of starting rotation at the state where the upper-part rotating body 3 is stopped. In the case of coming to a stop from the rotating state, drive control based on the zero speed command is performed until the rotation speed of the rotation electric motor 21 becomes zero even when the amount of operation of the lever 26A enters the range of ±10%.

[Rotation Drive Control Unit 40]

Figure 4:
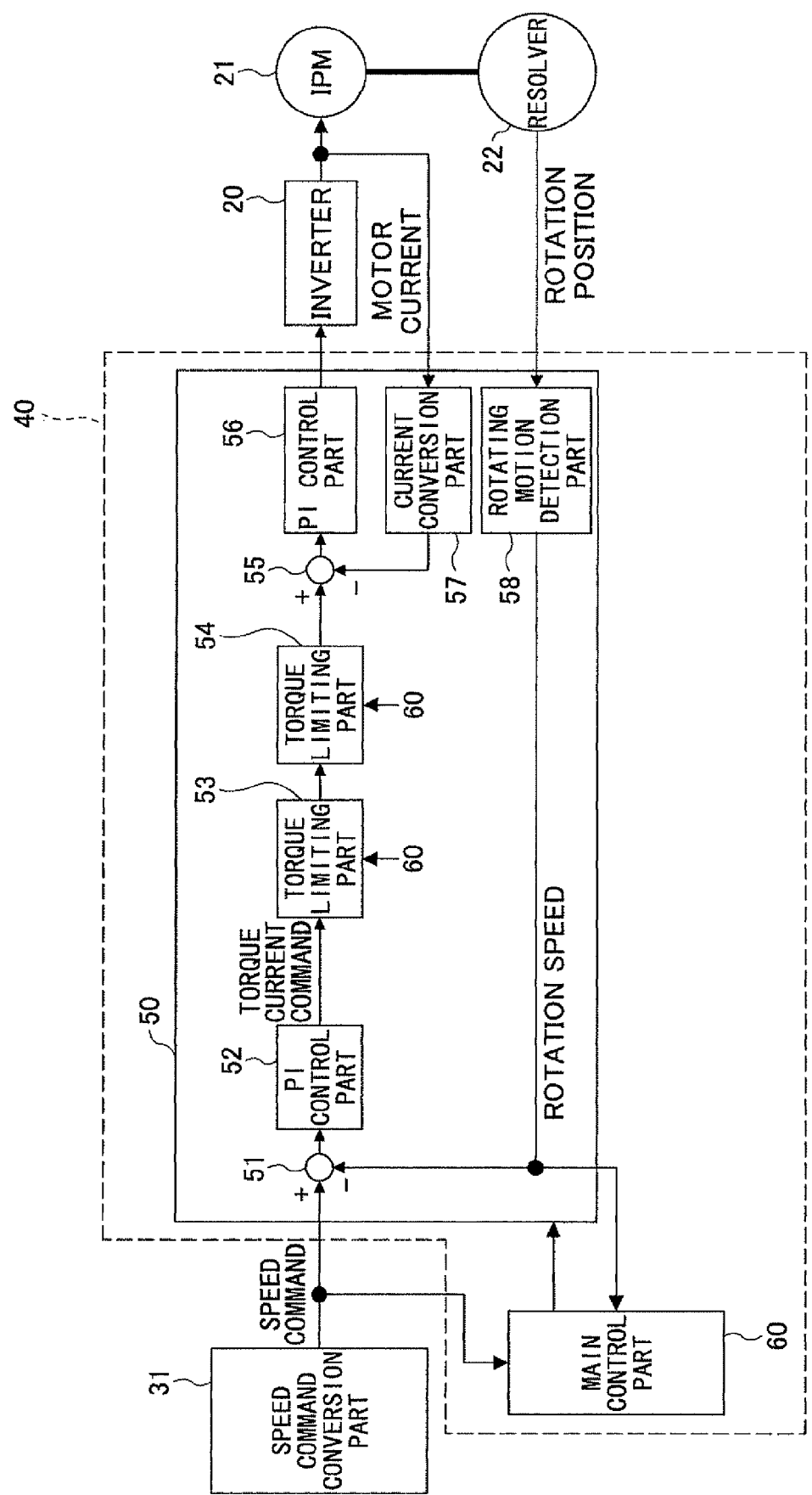
FIG. 4 is a control block diagram illustrating a configuration of a rotation drive control unit of the first embodiment.

FIG. 4 is a control block diagram illustrating a configuration of the rotation drive control unit 40 of the first embodiment.

The rotation drive control unit 40, which is a control unit for controlling the driving of the rotation electric motor 21 via the inverter 20, includes a drive command generation part 50 configured to generate a drive command for driving the rotation electric motor 21 and a main control part 60.

The rotation drive control unit 40 calculates a drive command for controlling the driving of the rotation electric motor 21 in accordance with the amount of operation of the lever 26A by executing a program for drive control contained in the internal memory of the controller 30.

Further, the rotation drive control unit 40 controls the switching of a power running operation and a regenerative operation and controls the charge and discharge of the battery 19 via the inverter 20 at the time of controlling the driving of the rotation electric motor 21 in accordance with the amount of operation of the lever 26A.

A speed command output from the speed command conversion part 31 in accordance with the amount of operation of the lever 26A is input to the drive command generation part 50, so that this drive command generation part 50 generates a drive command based on the speed command. The drive command output from the drive command generation part 50 is input to the inverter 20, and the rotation electric motor 21 is AC-driven by this inverter 20 based on a PWM control signal.

The main control part 60 is a control part configured to perform processing necessary for controlling the rotation drive control unit 40. The specific contents of the processing are described at each related part.

The rotation drive control unit 40 controls the switching of a power running operation and a regenerative operation and controls the charge and discharge of the battery 19 via the inverter 20 at the time of controlling the driving of the rotation electric motor 21 in accordance with the amount of operation of the operation lever 26A.

[Drive Command Generation Part 50]

The drive command generation part 50 includes a subtractor 51, a PI (Proportional Integral) control part 52, a torque limiting part 53, a torque limiting part 54, a subtractor 55, a PI control part 56, a current conversion part 57, and a rotating motion detection part 58. A speed command (rad/s) for rotation drive according to the amount of operation of the lever 26A is input to the subtractor 51 of this drive command generation part 50.

The subtractor 51 subtracts the rotation speed (rad/s) of the rotation electric motor 21 detected by the rotating motion detection part 58 from the value of a speed command (hereinafter, speed command value) according to the amount of operation of the lever 26A, and outputs a deviation. This deviation is used for PI control for causing the rotation speed of the rotation electric motor 21 to be closer to the speed command value (target value) in the PI control part 52 to be described below.

The PI control part 52 performs PI control based on the deviation input from the subtractor 51 so as to cause the rotation speed of the rotation electric motor 21 to be closer to the speed command value (target value) (that is, so as to decrease this deviation), and calculates a torque current command necessary therefor. The generated torque current command is input to the torque limiting part 53.

The torque limiting part 53 performs the process of limiting the value of the torque current command (hereinafter, torque current command value) in accordance with the amount of operation of the lever 26A. This limiting process is performed based on the limitation characteristic of a slow increase in the allowable value of the torque current command value in accordance with the amount of operation of the lever 26A. An abrupt increase in the torque current command value calculated by the PI control part 52 degrades controllability. Therefore, such limiting of the torque current command value is performed in order to prevent this.

The limitation characteristic of the torque limiting part 53 is contained in the internal memory of the main control part

60. The main control part 60 reads the limitation characteristic in the internal memory, and inputs it to the torque limiting part 53.

This limitation characteristic has a characteristic to slowly increase (the absolute value of) the allowable value of the torque current command value with an increase in the amount of operation of the lever 26A, and has a characteristic for limiting both the clockwise direction and the counterclockwise direction of the upper-part rotating body 3. Data showing the limitation characteristic are stored in the internal memory of the main control part 60, and are read by the torque limiting part 53.

The torque limiting part 54 limits the torque current command value input from the torque limiting part 53 so that a torque generated by the torque current command input from the torque limiting part 53 is less than or equal to the maximum allowable torque value of the rotation electric motor 21. This limitation of the torque current command value is performed on both the clockwise rotation and the counterclockwise rotation of the upper-part rotating body 3 the same as in the torque limiting part 53.

Here, the upper limit value (maximum value for clockwise rotation) and the lower limit value (minimum value for counterclockwise rotation) of the allowable value for limiting the torque current command value in the torque limiting part 54 are set to such values as to enable generation of drive torque for turning the boom 4, the arm 5, and the bucket 6 to the upper side of a slope even in the state where the upper-part rotating body on the slope 3 has large inertia moment with the boom 4, the arm 5 and the bucket 6 being extended even if the torque current command value is limited by the torque limiting part 54.

The allowable value of the torque limiting part 54 is contained in the internal memory of the main control part 60, and the main control part 60 reads the allowable value in the internal memory and inputs it to the torque limiting part 54. Further, the absolute value of this allowable value may be changed by a change command input from the main control part 60, and the allowable value is set to 100% in absolute value at a normal time, but is set to 0% at a start of rotation.

The subtractor 55 outputs a deviation obtained by subtracting the output value of the current conversion part 57 from the torque current command value input from the torque limiting part 54. This deviation is used in P1 control for causing the drive torque of the rotation electric motor 21 output from the current conversion part 57 to be closer to torque represented by the torque current command value (target value) input via the torque limiting part 54 in a feedback loop including the PI control part 56 and the current conversion part 57 described below.

The PI control part 56, based on the deviation input from the subtractor 55, performs PI control to reduce this deviation and generates a voltage command to become a final drive command to be sent to the inverter 20. The inverter 20 PWM-drives the rotation electric motor 21 based on the torque current command input from the PI control part 56.

The current conversion part 57 detects the motor current of the rotation electric motor 21, converts this into a value corresponding to the torque current command, and inputs it to the subtractor 55.

The rotating motion detection part 58 detects a change in the rotation position of the rotation electric motor 21 detected by the resolver 22 (that is, the rotation of the upper-part rotating body 3), and derives the rotation speed of the rotation electric motor 21 from a temporal change in the rotation position through a differential operation. Data representing the derived rotation speed are input to the subtractor 51 and the main control part 60.

In the drive command generation part 50 of such a configuration, a torque current command for driving the rotation electric motor 21 is generated based on the speed command input from the speed command conversion part 31, so that the upper-part rotating body 3 is rotated at a desired speed.

Figure 5:
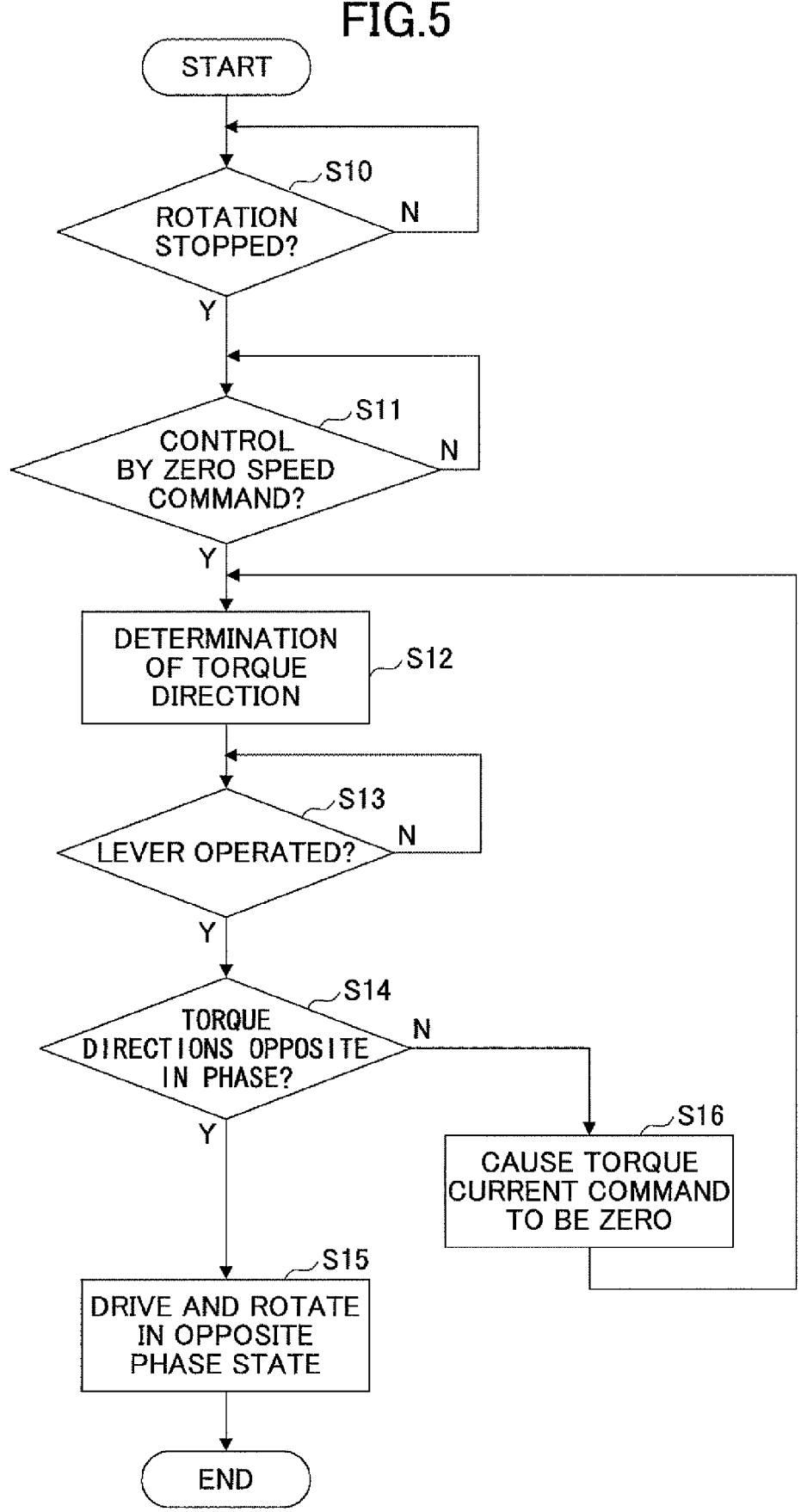
FIG. 5 is a chart illustrating a procedure of drive control by a main control part 60 of the rotation drive control unit 40 of the first embodiment at the start of the rotation of the rotation electric motor 21.

FIG. 5 is a chart illustrating a procedure of drive control by the main control part 60 of the rotation drive control unit 40 of the first embodiment at the start of the rotation of the rotation electric motor 21.

The main control part 60 starts processing upon activation of the rotation drive control unit 40.

First, the main control part 60 monitors whether the rotation speed of the rotation shaft 21A of the rotation electric motor 21 is zero, and determines whether the rotation of the upper-part rotating body 3 is stopped (step S10). The rotation speed is input from the rotating motion detection part 58. This process of step S10 is repeatedly performed until the stoppage of the rotation is confirmed.

If determining that the rotation is stopped, the main control part 60 determines whether the speed command output from the speed command conversion part 31 is a zero speed command (step S11). This is because immediately before the start of rotation, the amount of operation of the lever 26A is in the zero speed command region illustrated in FIG. 3 and drive control is performed so as to cause the rotation speed of the rotation shaft 21a of the rotation electric motor 21 to be zero with the mechanical brake 23 being released. This process of step S11 is repeatedly performed until the output of the zero speed command is confirmed.

Next, the main control part 60 determines the direction of torque applied on the rotation shaft 21A of the rotation electric motor 21 (hereinafter, torque direction) (step S12). Here, acceleration is calculated as a temporal change in the rotation speed input from the rotating motion detection part 58, and monitors the direction of this acceleration as the torque direction. Since the rotation shaft 21A of the rotation electric motor 21 and the rotation mechanism 2 are mechanically connected via the rotation reduction machine 24, the torque direction in the rotation shaft 21A of the rotation electric motor 21 is synonymous with the torque direction of the rotation shaft of the rotation mechanism 2.

A torque is applied if a temporal change in the rotation speed (acceleration) of the rotation shaft 21A is detected after determining in step S10 that the rotation is stopped (the rotation speed is zero). In particular, immediately after coming to a stop after the rotating state, the boom 4, the arm 5, and the bucket 6 may oscillate in the rotation directions. In step S12, the direction of these oscillations is detected as the torque direction based on a temporal change in the rotation speed (acceleration) of the rotation shaft 21A.

Next, the main control part 60 determines whether an operation for rotation has been input to the lever 26A (step S13). This is a process for determining whether or not the amount of operation of the lever 26A enters either the clockwise rotation drive region or the counterclockwise rotation drive region, and is a process performed by monitoring whether the value of the speed command input from the speed command conversion part 31 has changed from zero to either a positive or a negative value.

Further, by this process of step S13, the main control part 60 detects whether the rotation direction input to the lever 26A is clockwise or counterclockwise.

This process of step S13 is repeatedly performed until the input of an operation for rotation is confirmed.

The main control part 60 determines whether the torque direction detected in step S12 and the rotation direction detected in step S13 are opposite directions (step S14). Here, the torque direction is the direction of torque caused by the oscillations of the boom 4, the arm 5, and the bucket 6 in the rotation directions. Accordingly, the torque direction repeatedly changes to the clockwise rotation direction or the counterclockwise rotation direction in accordance with the oscillation cycle.

Therefore, the term "opposite directions" here refers to the inputting of counterclockwise rotation to the lever 26A while the torque direction is the clockwise rotation direction in the oscillation cycle, or to the inputting of clockwise rotation to the lever 26A while the torque direction is the counterclockwise rotation direction in the oscillation cycle.

If determining that the torque direction detected in step S12 and the rotation direction detected in step S13 are opposite directions, the main control part 60 maintains the allowable value of the torque limiting part 54 at a normal value (100%). Thereby, a torque current command is input from the rotation drive control unit 40 to the inverter 20, so that the rotation electric motor 21 is driven.

On the other hand, if determining that the torque direction detected in step S12 and the rotation direction detected in step S13 are the same direction, the main control part 60 sets the allowable value of the torque limiting part 54 to zero (step S16). Thereby, the torque current command output from the rotation drive control unit 40 is made zero, so that the rotation electric motor 21 is kept stationary without being driven even when the amount of operation of the lever 26A is in either the clockwise rotation drive region or the counterclockwise rotation drive region.

This is because if the driving of the rotation electric motor 21 is started when the torque direction detected in step S12 and the rotation direction detected in step S13 are the same direction, the boom 4, the arm 5, and the bucket 6 are swung back in a direction to delay with respect to the rotation direction so as to amplify oscillations (or generate new oscillations), so that a smooth start of rotation may be prevented, degrading ride quality.

After completion of the process of step S16, the main control part 60 proceeds with the procedure to step S12. The allowable value of the torque limiting part 54 is maintained at zero until the torque direction detected in step S12 and the rotation direction detected in step S13 are opposite directions as a result of execution of the processes of steps S13 and S14 after re-detecting the torque direction in the process of step S12.

Since the above process is repeatedly performed, the driving of the rotation electric motor 21 is started only in the state where the torque direction in the rotation shaft 21A of the rotation electric motor 21 and the rotation direction input to the lever 26A are opposite directions. Therefore, the boom 4, the arm 5, and the bucket 6 are prevented from being swung back in a direction to delay with respect to the rotation direction, so that rotation is smoothly started to make a ride comfortable.

If the torque direction in the rotation shaft 21A of the rotation electric motor 21 and the rotation direction input to the lever 26A are opposite directions, the start of the driving of the rotation electric motor 21 is delayed and on standby until they become the same direction. However, since the boom 4, the arm 5, and the bucket 6 have a very quick oscillation cycle of, for example, approximately 0.5 seconds to 1.5 seconds, the standby time is very short.

FIG. 6 shows graphs illustrating characteristics of a speed command, a rotation speed, and a drive torque at a time when the rotation of the rotation electric motor 21 is started by the rotation drive control unit 40 of the first embodiment, where (a) indicates characteristics in the case of starting rotation when the phases are opposite, and (b) indicates characteristics in the case of starting rotation when the phases are the same for the purpose of comparison.

In (a) of FIG. 6, the rotation speed of the rotation electric motor 21 is a speed of −60% and the upper-part rotating body 3 is rotating counterclockwise in the state of an elapsed time of 0 seconds. Further, since the speed command is zero (zero speed command), the drive torque is a maximum value in the clockwise rotation direction (200%).

When the rotation speed reaches 0% and the rotation is stopped at around an elapsed time of 1 second, the rotation speed fluctuates slightly. This fluctuation of the rotation speed is believed to be caused by the oscillations of the boom 4, etc., in the clockwise and counterclockwise rotation directions.

It is found that when a speed command for clockwise rotation rises with the rotation speed being a negative value (with the boom 4, etc., swinging in the counterclockwise direction) immediately before the elapsed time reaches 2 seconds, the drive torque of the forward rotation side rises with this, so that the rotation speed gradually rises.

On the other hand, in (b) of FIG. 6, the rotation speed of the rotation electric motor 21 is a speed of −60% and the upper-part rotating body 3 is rotating counterclockwise in the state of an elapsed time of 0 seconds. Further, since the speed command is zero (zero speed command), the drive torque is a maximum value in the clockwise rotation direction (200%).

It is found that when a speed command for clockwise rotation rises at the same time that the rotation speed reaches 0% to stop the rotation at around an elapsed time of 1 second, the drive torque of the forward rotation side rises with this, so that the rotation speed rises with fluctuations.

This is believed to be that oscillations were generated in the boom 4, etc., because the speed command for clockwise rotation was caused to rise with the rotation speed being switched to a positive value (with the boom 4, etc., being swung in the clockwise rotation direction immediately after the stoppage of their counterclockwise rotation).

Thereby, according to the rotation drive control unit 40 of the first embodiment, the driving of the rotation electric motor 21 is started only in the state where the torque direction in the rotation shaft 21A of the rotation electric motor 21 and the rotation direction input to the lever 26A are opposite directions. This prevents the boom 4, the arm 5, and the bucket 6 from being swung back in a direction to delay with respect to the rotation direction, thus resulting in a smooth start of rotation and good ride quality.

Further, it is possible to provide a rotation drive control unit and a construction machine that can prevent generation of impact due to teeth hitting due to the backlash of the rotation mechanism. Further, since it is possible to prevent teeth hitting due to the backlash of the rotation mechanism 2, it is possible to prolong the useful service life of the rotation mechanism 2.

The above description is given of a configuration where the allowable value of the torque limiting part 54 is set to zero if it is determined that the torque direction detected in step S12 and the rotation direction detected in step S13 are the same direction. However, the allowable value in this case is not limited to zero, and may be set to such a value as to allow such a torque current command as to not cause rotation of the rotation shaft 21A of the rotation electric motor 21 (for example, a value that is approximately 10% of a normal value).

The above description is given of a configuration where the rotation electric motor 21 is an AC motor PWM-driven by the inverter 20, and the resolver 22 and the rotating motion detection part 58 are used to detect its rotation speed. However, the rotation electric motor 21 may be a DC motor. In this case, the inverter 20, the resolver 22, and the rotating motion detection part 58 are unnecessary, and a value detected with the tachogenerator of the DC motor may be used as the rotation speed.

Further, the above description is given of a configuration where PI control is used in calculating a torque current command. Alternatively, robust control, adaptive control, proportional control, integral control, etc., may be used.

Further, the above description is given using a hybrid construction machine. However, the construction machine to which to apply the rotation drive unit of the first embodiment is not limited to a hybrid type as long as the construction machine has a motorized rotation mechanism.

Second Embodiment

Figure 7:
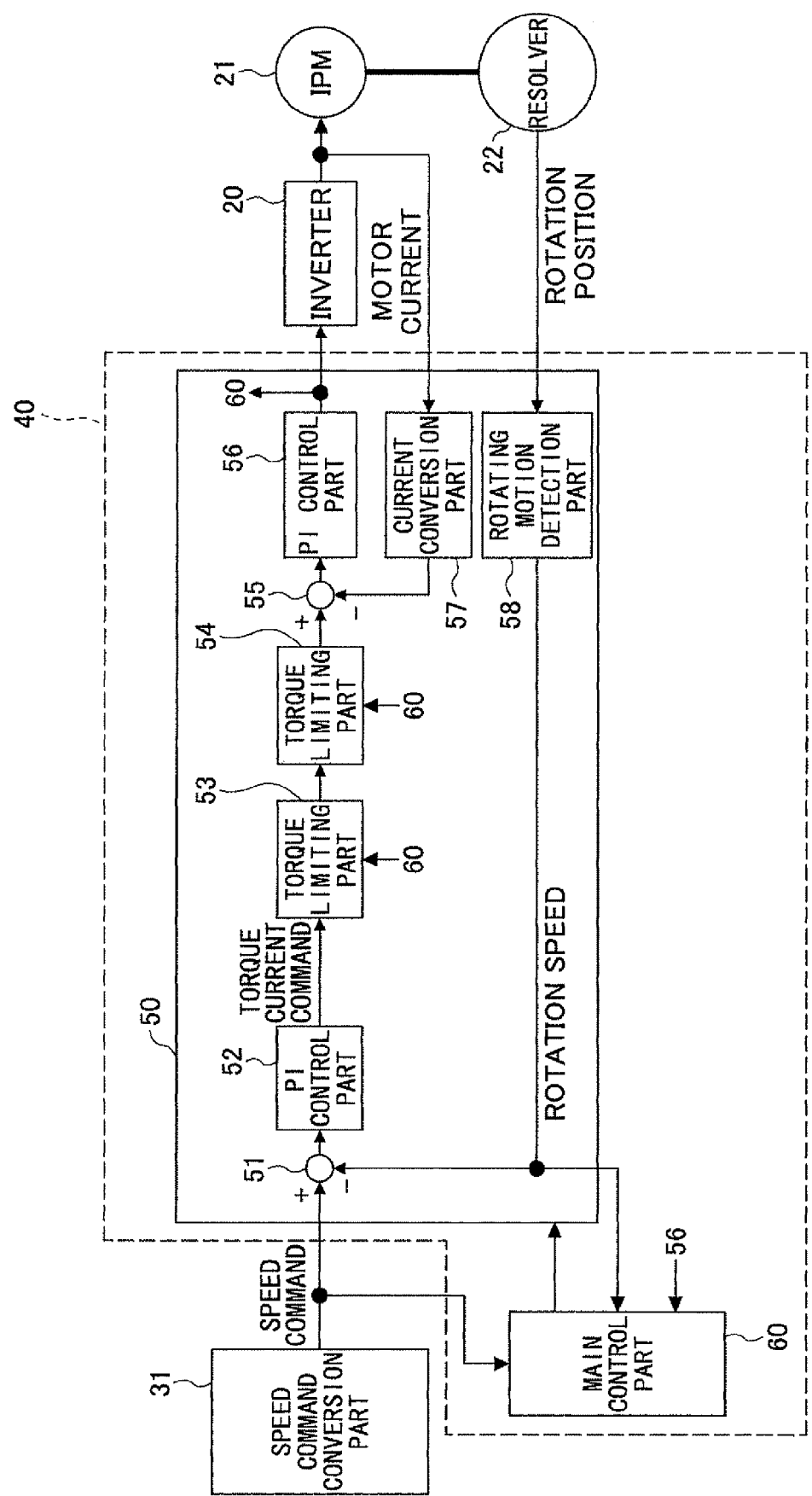
FIG. 7 is a control block diagram illustrating a configuration of the rotation drive control unit 40 of a second embodiment.

FIG. 7 is a control block diagram illustrating a configuration of the rotation drive control unit 40 of a second embodiment. In the first embodiment, a description is given of a configuration where acceleration, which is a temporal change in the rotation speed input from the rotating motion detection part 58, is calculated, the direction of this acceleration is detected as the torque direction of the rotation shaft of the rotation mechanism 2 (a torque direction in the rotation shaft 21*a* of the rotation electric motor 21), and rotation drive is controlled using this torque direction. The rotation drive control unit 40 of the second embodiment is different from the first embodiment in controlling rotation drive by determining the torque direction based on the torque current command value output from the PI control part 56. The other components are the same as in the first embodiment, so that the same components are given the same characters and their description is omitted.

That is, the main control part 60 of the rotation drive control unit 40 of the second embodiment detects the torque direction (a torque direction in the rotation shaft 21*a* of the rotation electric motor 21) based on the torque current command value output from the PI control part 56, and executes the same procedure as the one illustrated in FIG. 5.

The torque current command value output from the PI control part 56 is calculated based on the deviation between the speed command value and the rotation speed (rad/s), and therefore, represents the direction of the torque applied on the rotation shaft 21A of the rotation electric motor 21.

Therefore, it is also possible to perform rotation drive control the same as in the first embodiment by controlling rotation drive using the torque direction indicated by the torque current command value output from the PI control part 56 in place of the direction of the acceleration calculated as a temporal change in the rotation speed.

Thereby, according to the rotation drive control unit 40 of the second embodiment, the driving of the rotation electric motor 21 is started only in the state where the torque direction represented by the torque current command value output from the PI control part 56 and the rotation direction input to the lever 26A are opposite directions. This prevents the boom 4, the arm 5, and the bucket 6 from being swung back in a direction to delay with respect to the rotation direction, thus resulting in a smooth start of rotation and good ride quality.

Figure 8:
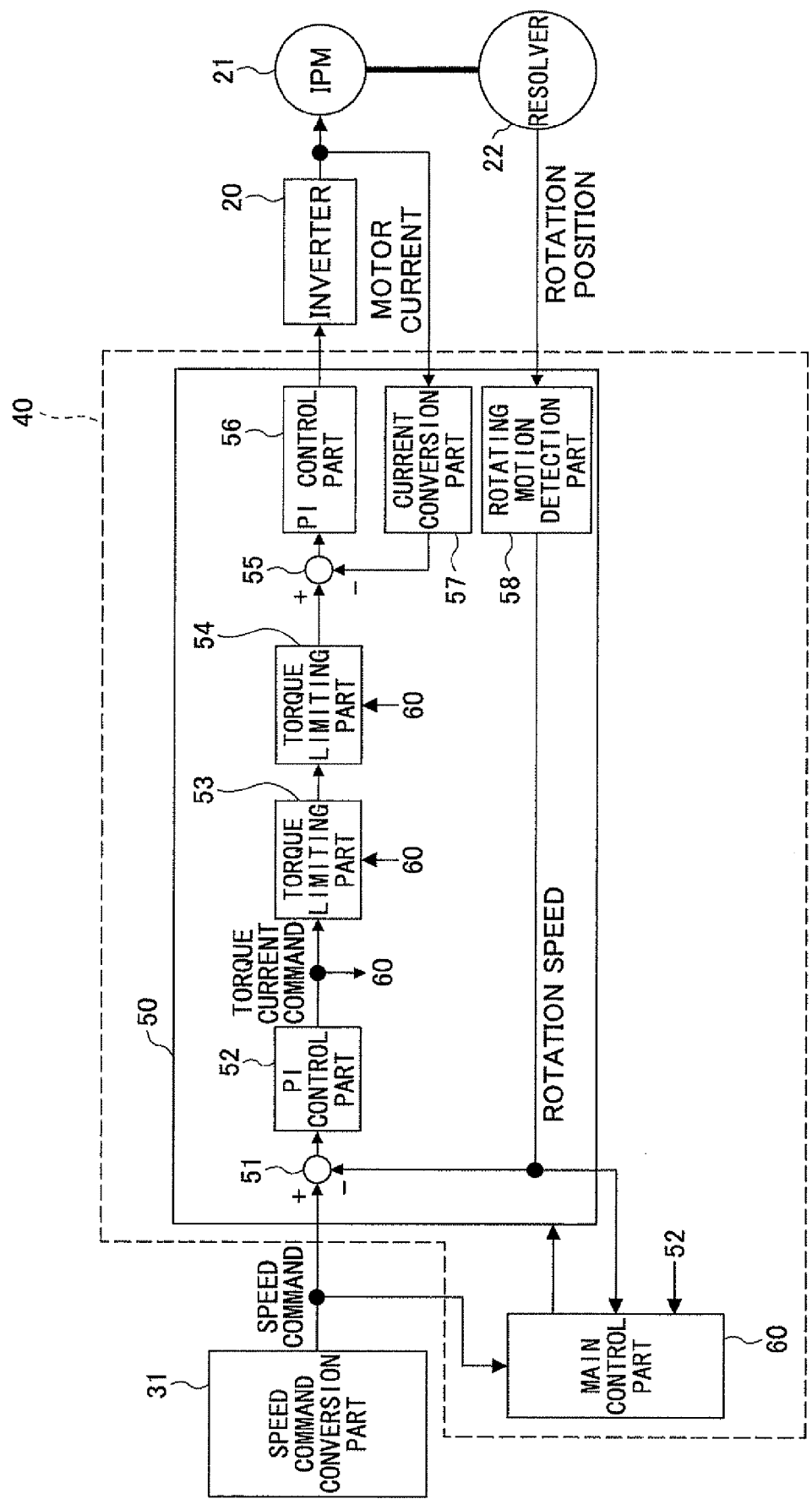
FIG. 8 is a control block diagram illustrating a configuration of the rotation drive control unit 40 of a variation of the second embodiment.

FIG. 8 is a control block diagram illustrating a configuration of the rotation drive control unit 40 of a variation of the second embodiment.

FIG. 7 illustrates control blocks that control rotation drive using the torque direction represented by the torque current command value output from the PI control part 56, while the torque current command value output from the PI control part 52 may be used in place of the torque current command value output from the PI control part 56.

The torque current command value output from the PI control part 52, which also is calculated based on the deviation between the speed command value and the rotation speed (rad/s), represents the direction of the torque applied on the rotation shaft 21A of the rotation electric motor 21 the same as the torque current command value output from the PI control part 56.

Therefore, the rotation drive control may be performed using the torque direction indicated by this torque current command value, using the torque current command value output from the PI control part 52 in place of the torque current command value output from the PI control part 56.

Thereby, according to the rotation drive control unit 40 of the variation of the second embodiment, the driving of the rotation electric motor 21 is started only in the state where the torque direction represented by the torque current command value output from the PI control part 52 and the rotation direction input to the lever 26A are opposite directions. This prevents the boom 4, the arm 5, and the bucket 6 from being swung back in a direction to delay with respect to the rotation direction, thus resulting in a smooth start of rotation and good ride quality.

Third Embodiment

Figure 9:
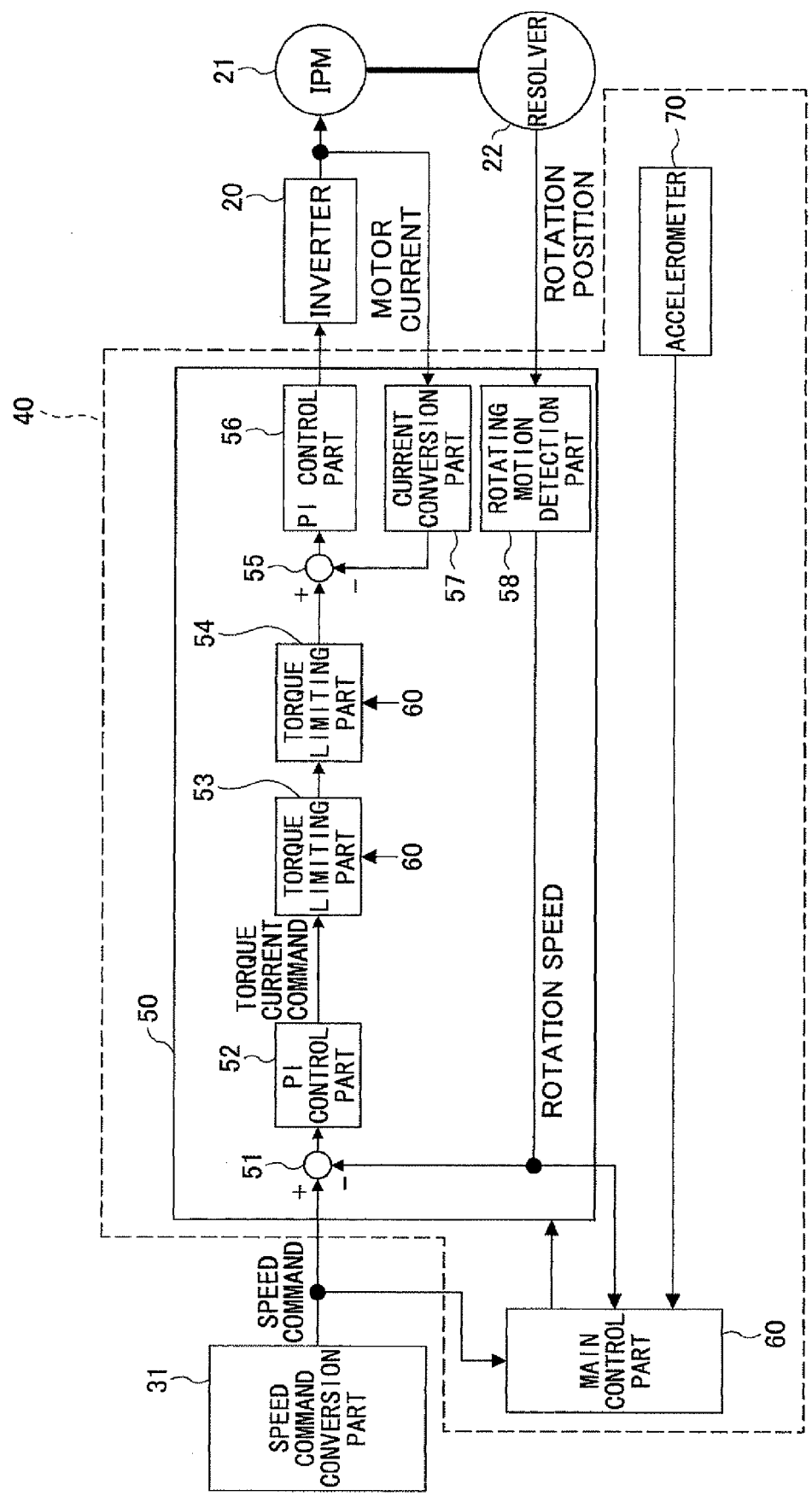
FIG. 9 is a control block diagram illustrating a configuration of the rotation drive control unit 40 of a third embodiment.

FIG. 9 is a control block diagram illustrating a configuration of the rotation drive control unit 40 of a third embodiment. The rotation drive control unit 40 of the third embodiment is different from the first embodiment in having an accelerometer 70 as means for detecting a rotation direction and in that the main control part 60 detects a torque direction (a torque direction in the rotation shaft 21A of the rotation electric motor 21) based on the acceleration detected with the accelerometer 70. The other components are the same as in the first embodiment, so that the same components are given the same characters and their description is omitted.

The main control part 60 of the rotation drive control unit 40 of the third embodiment detects the torque direction of the rotation shaft of the rotation mechanism (a torque direction in the rotation shaft 21*a* of the rotation electric motor 21) based on the acceleration input from the accelerometer 70, and executes the same procedure as the one illustrated in FIG. 5.

For example, an acceleration sensor may be used as this accelerometer 70. This acceleration sensor may be either provided inside the upper-part rotating body 3 or attached to the boom 4, the arm 5, or the bucket 6.

Thereby, according to the rotation drive control unit 40 of the third embodiment, the driving of the rotation electric motor 21 is started only in the state where the torque direction in the rotation shaft 21A of the rotation electric motor 21 detected by the accelerometer 70 and the rotation direction input to the lever 26A are opposite directions. This prevents the boom 4, the arm 5, and the bucket 6 from being swung back in a direction to delay with respect to the rotation direction, thus resulting in a smooth start of rotation and good ride quality.

The above description is given of the rotation drive control units and the construction machine using the same of exemplary embodiments of the present invention. The present invention, however, is not limited to the specifically disclosed embodiments, and variations and modifications may be made without departing from the scope of the claims.

The invention claimed is:

1. A rotation drive control unit configured to control driving of a rotation mechanism of a construction machine driven to rotate by an electric motor, the rotation drive control unit comprising:
a speed command output part configured to output a speed command controlling a rotation speed of the electric motor based on an amount of operation input via an operation part of the construction machine;
a torque direction detection part configured to detect a direction of a torque applied on a rotation shaft of the rotation mechanism; and
a drive control part configured to generate a drive command driving the electric motor based on the speed command output from the speed command output part and to control driving of the electric motor,
wherein in starting a rotation of the rotation mechanism, the drive control part starts driving the electric motor using the drive command if a direction of the rotation represented by the speed command output from the speed command output part and the direction of the torque detected by the torque direction detection part are opposite directions.

2. The rotation drive control unit as claimed in claim 1, wherein if the direction of the rotation represented by the speed command output from the speed command output part and the direction of the torque detected by the torque direction detection part are a same direction when the operation part is operated, the drive control part starts driving the electric motor after the direction of the torque detected by the torque direction detection part becomes opposite to the direction of the rotation.

3. The rotation drive control unit as claimed in claim 2, wherein if the direction of the rotation represented by the speed command output from the speed command output part and the direction of the torque detected by the torque direction detection part are the same direction, the drive control part causes an absolute value of a value of the drive command to be less than or equal to a predetermined value until the direction of the torque detected by the torque direction detection part becomes opposite to the direction of the rotation.

4. The rotation drive control unit as claimed in claim 3, wherein the drive control part comprises a limiting part configured to limit the absolute value of the value of the drive command so that a drive torque generated in the electric motor by the drive command is less than or equal to an allowable value, and causes the absolute value of the value of the drive command to be less than or equal to the predetermined value by causing an absolute value of the allowable value to be less than a normal value.

5. The rotation drive control unit as claimed in claim 1, wherein the torque direction detection part is configured to calculate a temporal change in the rotation speed of the electric motor and to detect, as the direction of the torque, a direction of an acceleration represented by the temporal change in the rotation speed.

6. The rotation drive control unit as claimed in claim 1, wherein the torque direction detection part is configured to detect, as the direction of the torque, a torque direction represented by the drive command generated by the drive control part.

7. The rotation drive control unit as claimed in claim 1, further comprising:
an accelerometer configured to detect an acceleration generated by the rotation of the rotation mechanism,
wherein the torque direction detection part is configured to detect the direction of the torque based on a direction of the acceleration detected by the accelerometer.

8. A construction machine, comprising:
the rotation drive control unit as claimed in claim 1.

9. The rotation drive control unit as claimed in claim 1, wherein the drive control part determines whether the direction of the rotation represented by the speed command output from the speed command output part and the direction of the torque detected by the torque direction detection part are opposite directions, and starts driving the electric motor using the drive command in response to determining that the direction of the rotation represented by the speed command output from the speed command output part and the direction of the torque detected by the torque direction detection part are opposite directions.

* * * * *